US012303821B2

(12) United States Patent
Cadieu et al.

(10) Patent No.: US 12,303,821 B2
(45) Date of Patent: May 20, 2025

(54) GAS ADSORPTION TREE

(71) Applicant: SPIRITUS TECHNOLOGIES, PBC, White Rock, NM (US)

(72) Inventors: Charles Frederick Cadieu, Burlingame, CA (US); Jose Manuel Tafoya, Santa Fe, NM (US); Matthew Nicholson Lee, Los Alamos, NM (US)

(73) Assignee: Spritius Technologies, PBC, White Rock, NM (US)

( * ) Notice: Subject to any disclaimer, the term of this patent is extended or adjusted under 35 U.S.C. 154(b) by 419 days.

(21) Appl. No.: 18/077,513

(22) Filed: Dec. 8, 2022

(65) Prior Publication Data

US 2024/0189754 A1    Jun. 13, 2024

(51) Int. Cl.
*B01D 53/02* (2006.01)
*B01D 53/04* (2006.01)

(52) U.S. Cl.
CPC .... *B01D 53/0407* (2013.01); *B01D 2253/311* (2013.01); *B01D 2253/34* (2013.01)

(58) Field of Classification Search
CPC .......... B01D 2253/311; B01D 2253/34; B01D 53/0407; B01D 53/0462; B01D 53/08
See application file for complete search history.

(56) References Cited

U.S. PATENT DOCUMENTS

| 5,730,860 A * | 3/1998 | Irvine ................... C10G 25/08 208/213 |
| 7,410,524 B2 | 8/2008 | Howard |
| 2021/0093993 A1* | 4/2021 | Strand ................... B01D 53/08 |

FOREIGN PATENT DOCUMENTS

| CN | 109569192 A | 4/2019 |
| DE | 3830618 A | 3/1990 |
| DE | 102005049745 B3 | 8/2007 |
| EP | 23213511.1 | 4/2024 |

OTHER PUBLICATIONS

Donkey Kong; Atari; https://archive.org/details/Donkey_Kong_1988_Atari_NTSC (Year: 1988).*

* cited by examiner

*Primary Examiner* — Christopher P Jones
(74) *Attorney, Agent, or Firm* — CRGO Global; Steven M. Greenberg

(57) ABSTRACT

A gas adsorption tree includes a track of multiple, different porous descending levels each pair of the levels defining therebetween an angle of declination. The tree further includes a single exit disposed at a distal end of the track. Finally, the tree includes multiple, different gas adsorbent spheres each traversing each of the levels of the track towards the single exit according to gravitational motivation. In one aspect of the embodiment, the porous descending levels are circuits which when combined form a spiral track. In an alternative aspect of the embodiment, the porous descending levels are ramps such that an ascending edge of each lower positioned one of the ramps in the tree extends beyond a descending edge of an adjacent upper positioned one of the ramps in the tree.

13 Claims, 4 Drawing Sheets

GAS ADSORPTION TREE

BACKGROUND OF THE INVENTION

Field of the Invention

The present invention relates to the field of gas adsorption and more particular to an apparatus arranged to promote gas adsorption onto capture elements of the apparatus.

Description of the Related Art

Adsorption refers to the increase in concentration of a substance at an interface of a condensed and a liquid or gaseous layer owing to the operation of surface forces. More concretely, adsorption is the adhesion of molecules of gas, liquid, or dissolved solids to a surface. The adsorption process results in the creation of a film of an adsorbate upon a surface of an adsorbent. Adsorption differs from absorption in which one substance permeates another. As well, whereas adsorption can be characterized as a surface phenomenon, absorption involves the whole volume of the material. Like surface tension, adsorption is a consequence of surface energy.

Adsorption capitalizes upon the tendency of one or more components of a liquid or gas to collect on the surface of a solid. This tendency can be leveraged to remove solutes from a liquid or gas or to separate components that have different affinities for the solid. The process objective may be either waste treatment or the purification of valuable components of a feed stream. In an adsorption process, the solid is called the adsorbent and the solute is known as the adsorbate.

In a large-sale adsorption process, a capture element formed of a gas adsorbent material, when placed into a gaseous environment, removes targeted molecules from the gaseous environment through the adsorption of the targeted molecules onto the gas adsorbent material. Thereafter, the removal of the capture element from the gaseous environment results in the removal from the gaseous environment of the adsorbed molecules. Gas adsorption, however, is not an instantaneous process. Rather, gas adsorption is a process requiring time during which an adequate flow of gas meets the gas adsorbent material of the capture element in order to permit the process of gas adsorption to complete. In a laboratory setting, the timing is of little consequence, but in a large-scale, industrial setting, not just time but also space are scarce.

Hence, essential to any large-scale gas adsorption process in a gas adsorption plant is the maximization of the presentation of surface area of the gas adsorbent material of the capture element in as small a footprint in the plant as possible in order to permit the maximization of the number of target molecules adsorbed onto the capture element despite the time required to achieve optimized gas adsorption.

BRIEF SUMMARY OF THE INVENTION

Embodiments of the present invention address deficiencies of the art in respect to large scale gas adsorption and provide a novel and non-obvious gas adsorption tree. In an embodiment of the invention, a gas adsorption tree includes a track of multiple, different porous descending levels each pair of the levels defining therebetween an angle of declination. The tree further includes a single exit disposed at a distal end of the track. Finally, the tree includes multiple, different gas adsorbent spheres each traversing each of the levels of the track towards the single exit according to gravitational motivation. In one aspect of the embodiment, the porous descending levels are circuits which when combined form a spiral track. In an alternative aspect of the embodiment, the porous descending levels are ramps such that an ascending edge of each lower positioned one of the ramps in the tree extends beyond a descending edge of an adjacent upper positioned one of the ramps in the tree.

Aspects of the embodiment are numerous and including the following possibilities, none of which reflect an exclusive expression of the foregoing invention:

- The angle of declination is constant as between each of the porous descending levels.
- Each of the porous descending levels includes netting which may include intersecting strands of wire forming a wire mesh or intersecting strands of nylon string.
- An exit sentry is placed at the single exit and includes a barricade toggleably inhibiting and permitting an exiting of proximate ones of the gas adsorbent spheres from a lowest one of the porous descending levels.
- A radius of each of the porous descending levels exceeds a radius of each of the gas adsorbent spheres by a multiple value, for instance twenty.
- The track includes at least twenty of the porous descending levels separated from one another by at least a clearance exceeding a diameter of the gas adsorbent spheres.
- An air handler is disposed at one end of the spiral track directing a column of air through the porous descending levels and about each of the gas adsorbent spheres.

To the extent that the track is a spiral track, additional variations are contemplated herein including:

- The spiral track is secured to a shaft intersecting the spiral track longitudinally through a vertex of each of the porous descending circuits.
- The spiral track is secured to the shaft with a series of cables affixed to a portion of the shaft above the spiral track at one end, at a circumferential portion of the spiral track, and to a portion of the shaft below the spiral track.
- A secondary spiral track is provided in respect to the primary spiral track and includes an additional porous descending circuits defining therebetween an angle of declination and positioned above the primary spiral track and secured to the shaft intersecting the secondary spiral track longitudinally through a vertex of each of the additional porous descending circuits.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE INVENTION

Embodiments of the invention provide for a gas adsorption tree adapted to gravitationally motivate gas adsorbent spheres through a gas adsorption process. In accordance with an embodiment of the invention, a gas adsorption tree includes multiple different porous levels vertically arranged with respect to one another by an angle of declination so that gas adsorption spheres places at a topmost one of the levels gravitationally motivate from the topmost one of the levels towards a bottommost one of the levels. The rate at which the spheres traverse the tree from top to bottom depends upon the angle of declination, the number of levels present in the tree, and optionally, a toggleable exit sentry that moderates a number of the spheres permitted to egress the tree. In this way, the surface area of the gas adsorbent material of each the spheres may be presented as an adsorbent to adsorbate-carrying gas from all locations on the surface of the spheres in as small a footprint in the plant as possible in order to permit the maximization of the number of target molecules adsorbed onto the spheres despite the time required to achieve optimized gas adsorption.

Figure 1:
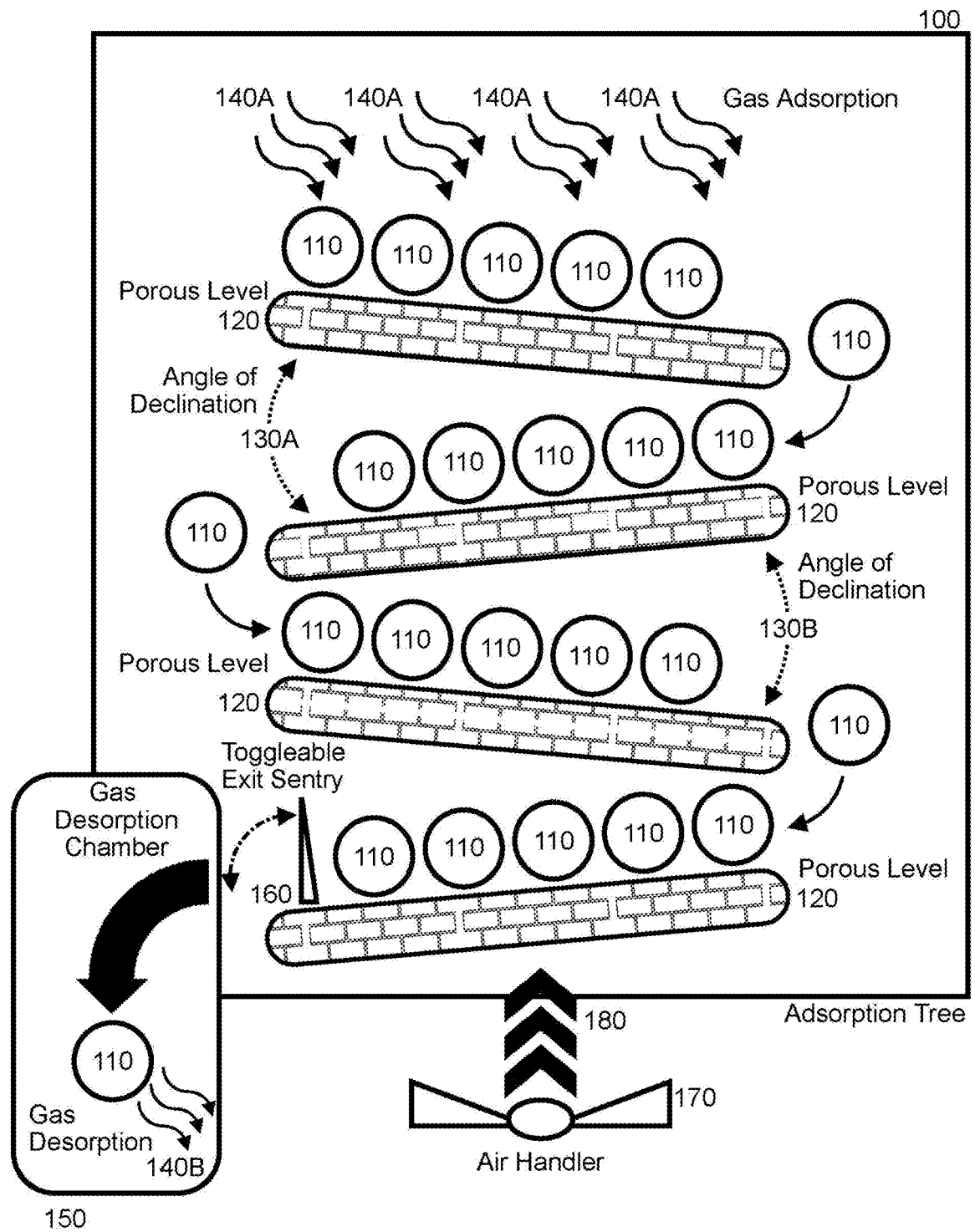
FIG. 1 is pictorial illustration of a gas adsorption tree adapted to gravitationally motivate gas adsorbent spheres through a gas adsorption process.

In further illustration, FIG. 1 pictorially shows a gas adsorption tree adapted to gravitationally motivate gas adsorbent spheres through a gas adsorption process. As shown in FIG. 1, a set of gas adsorbent spheres 110 are placed at an ingress position of a gas adsorption tree 100 which includes multiple different porous levels 120 vertically arranged with respect to one another at one or more different angles of declination 130A. In this regard, the different angles of declination 130A are sufficiently large to promote the gravitational motivation of each of the spheres 110 towards a distal end of each of the porous levels 120 so as to descend onto a proximal end of a next lowest one of the porous levels 120 which proximal end extends beyond the distal end of the adjacent upper one of the porous levels 120 as shown herein. To that end, the different angles of declination 130A can be the with respect to each pair of the porous levels 120, or the different angles of declination can differ at different locations of the adsorption tree 100.

The gas adsorbent spheres 110 each can include a spherical substrate onto which a gas adsorbent is affixed so as to promote the gas adsorption of an adsorbate 140A present in gas permeating all sides of the gas adsorbent spheres 110. In particular, in so far as each of the porous levels 120 is porous with respect to atmospheric gas within the adsorption tree 100, the gas envelops all portions of the spheres 110. The porosity of the porous levels 120 can be achieved with the construction of the porous levels 120 as a mesh screen or netting. For instance, the netting can include intersecting strands of wire forming a wire mesh or intersecting strands of nylon string to name two examples. Optionally, to promote the saturation of the spheres 110 in the gas, an air handler 170 such as a blower or fan positioned at an end of the adsorption tree 110 or alongside the adsorption tree 110 can promote forced gas 180 into the adsorption tree.

As shown in FIG. 1, the gravitationally driven movement of the spheres 110 can be moderated not only in consequence of the angles of declination and the number of porous levels 120 present in the gas adsorption tree 100, but also by a toggleable exit sentry 160 positioned at a point of egress from a lowest one of the porous levels 120. The toggleable exit sentry 160 can be mechanically activated and de-activated to permit passage and inhibit passage of the spheres 110 into a gas desorption chamber 150 in which adsorbate 140B adsorbed onto the surface of the spheres 110 in the gas desorption chamber experience a process of desorption into the local atmosphere of the gas desorption chamber 150. For example, the toggleable exit sentry 160 can be vertical obstruction which rises and lowers periodically to permit a particular rate of egress of the spheres 110 from the gas adsorption tree 100.

Importantly, the gas adsorption tree 100 can be enclosed in a silo formed with louvered walls or with walls of a permeable mesh and can be included with multiple other trees in order to form a grove of gas adsorption trees. In more particularly illustration, FIGS. 2A and 2B, taken together, are a schematic illustration of a grove of gas adsorption trees coupled to a gas desorption chamber. As expressed by FIG. 2A, each silo 200A includes not only a gas adsorption tree 230, but also a gas desorption chamber 250. As such, a desorption chamber interface 240 is provided which facilitates a transition of the spheres 210 with adsorbate adsorbed thereupon from the gas adsorption tree 230 into the desorption chamber 250, while inhibiting premature desorption of the adsorbate before the adsorbate can be desorbed in the desorption chamber 250 and pumped into adsorbate storage 280. Similarly, an adsorption tree interface 220 is provided through which the spheres 210 are received from a transport channel 260 such as a conveyor belt or elevator, and in which the spheres 210 are heated and outgassed in preparation for re-use in the adsorption tree 230.

Figure 2A:
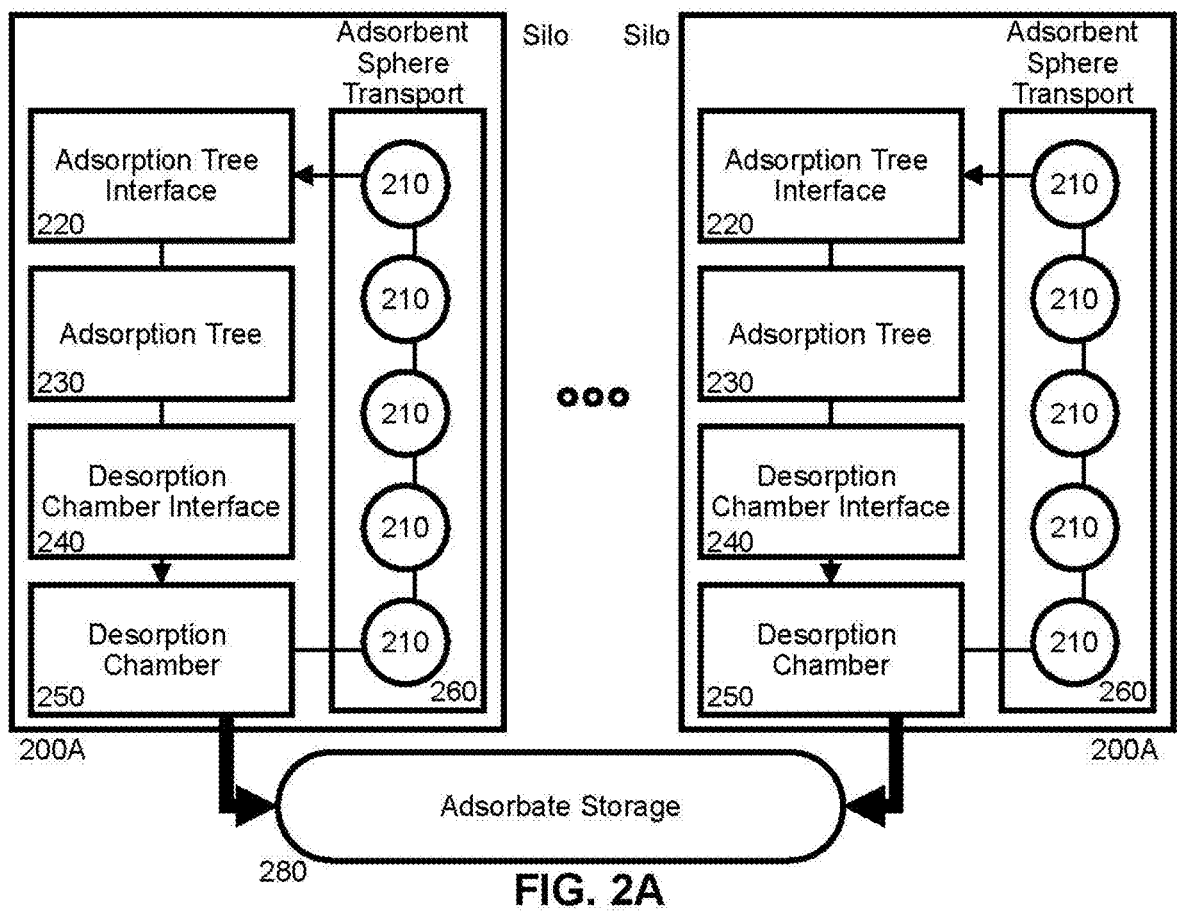
FIGS. 2A and 2B, taken together, are a schematic illustration of a grove of gas adsorption trees coupled to a gas desorption chamber.
Figure 2B:
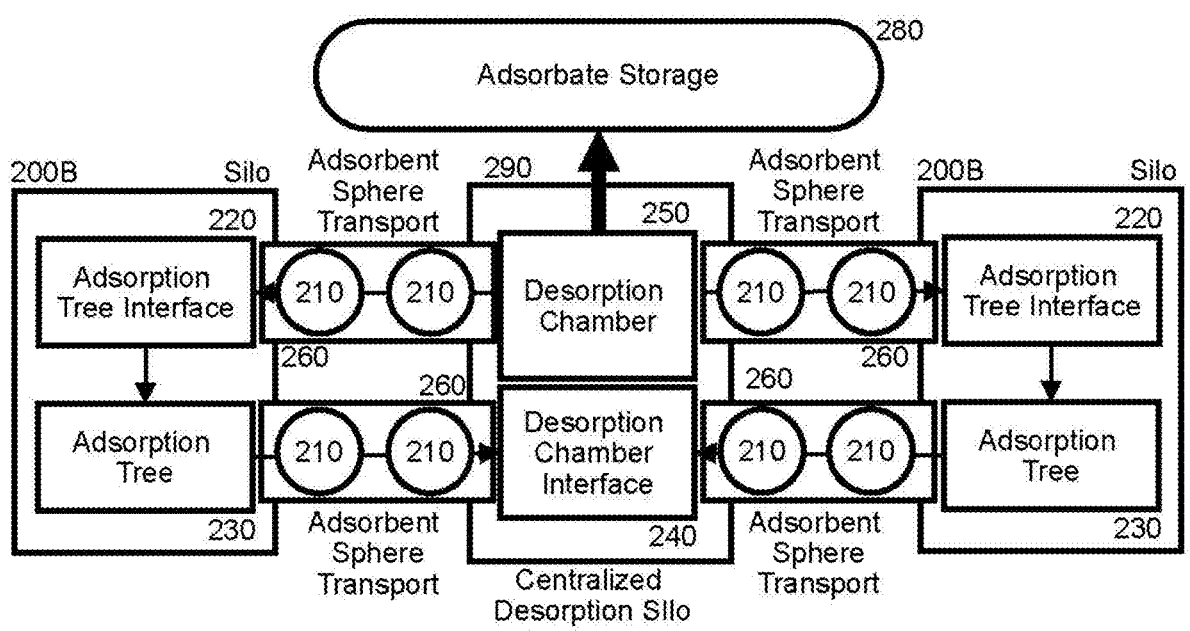

In the embodiment shown in FIG. 2A, each of the silos 200A includes a corresponding desorption chamber 250, however, in a different embodiment shown in FIG. 2B, the desorption chamber 250 coupled to the adsorbate storage 280 can be common to all of the silos 200B which then include only an adsorption tree 230 and an adsorption tree interface 220. In this instance, a separate centralized desorption silo 290 is provided for a set of the gas adsorption silos 200B, each coupled both to the desorption chamber interface 240 by way of a corresponding adsorbent sphere transport 260 transporting spheres 210 from the adsorption tree 230 to the desorption chamber interface 240, and also to the desorption chamber 250 by way of a separate adsorbent sphere transport 260 transporting spheres 210 from the desorption chamber 250 back to the adsorption tree interface. In the latter case, different adsorbent sphere transports 260 are selected for transporting spheres 210 from the desorption chamber 250 according to a selector such as a collection of conveyor diverter gates.

Figure 3:
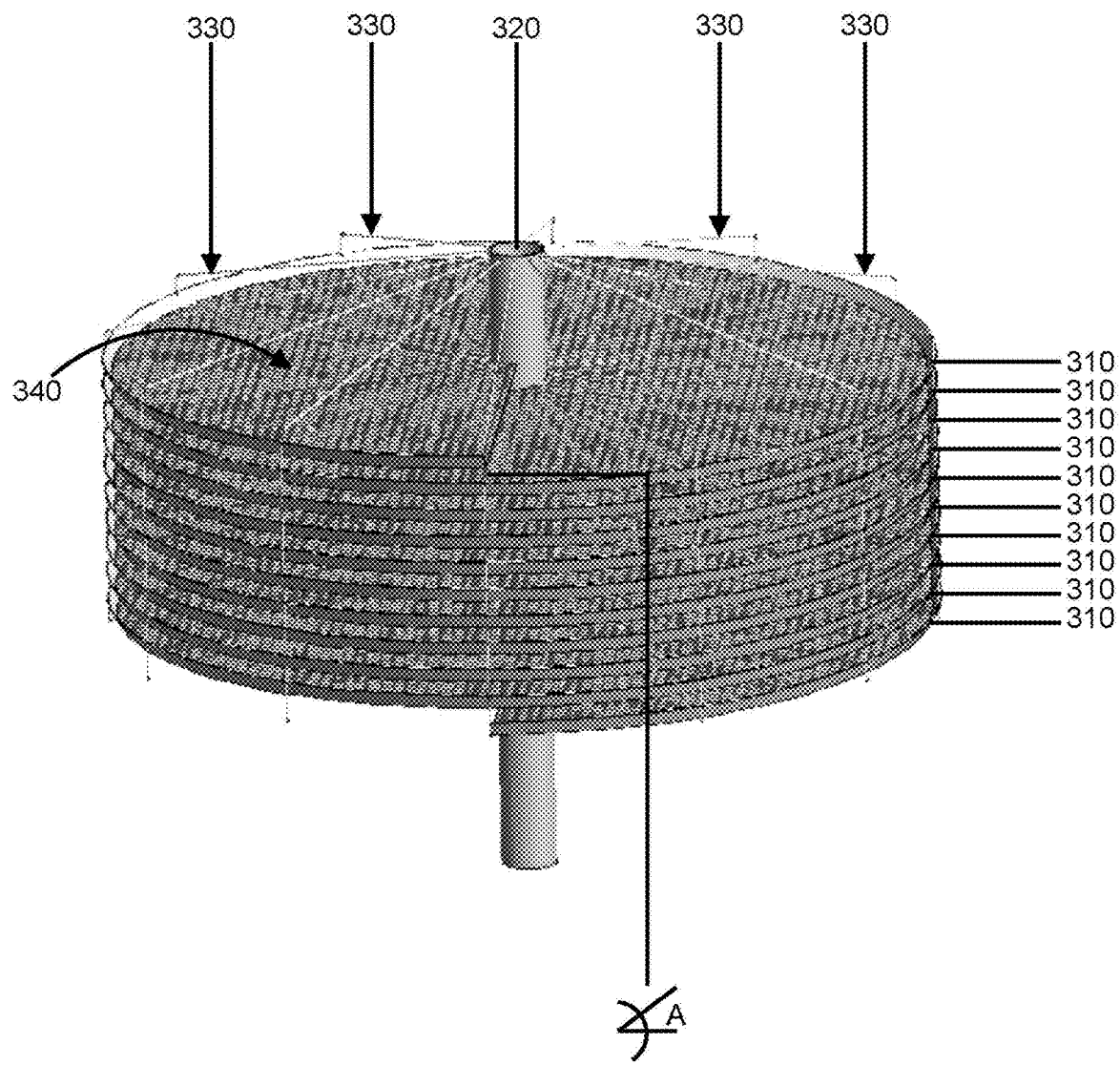
FIG. 3 is a perspective view of spiral track embodiment of the gas adsorption tree of FIG. 1; and, FIG. 4 is a perspective view of an alternating ramp embodiment of the gas adsorption tree of FIG. 1.

Notably, the gas adsorption trees 230 can take many forms. In one possible aspect of either the embodiment of FIG. 2A or the embodiment of FIG. 2B, the gas adsorption trees 230 each can include a set of multiple different porous descending levels structured as circuits which when combined form a primary spiral track. In illustration, FIG. 3 is a perspective view of spiral track embodiment of the gas adsorption tree of FIG. 1. As shown in FIG. 3, the gas adsorption tree 300 includes a series of discs 310 of porous material 340, for instance wire or nylon netting, are coupled end to end at a radial cut in each to form a continuous, primary spiral track from a point of ingress at a top most circuit of the track to a point of egress at a bottom most circuit of the track.

The discs 310 are then separated from one another to form an angle of declination between each pair of the discs 310. Depending upon the spacing selected between each of the discs 310, the angle of declination A can be constant for the entirety of the spiral track, or the angle of declination A can very from one pair of the discs 310 to another. However, in all circumstances, the distance between each of the discs 310 must at least exceed the diameter of the gas adsorbent spheres placed therein. Further, as shown in FIG. 3, the radius of each of the discs 310 at least can be large enough to accommodate several gas adsorbent spheres side-by-side, preferably twenty spheres across. Yet further, it is preferred to include at least twenty of the discs 310 in the spiral track so as to permit the inclusion in the tree 300 of a large number of gas adsorbent spheres.

The spiral track is then secured to a pole 320 intersecting each of the discs 310 at a corresponding vertex. Tensioned cabling 330 fixed to a top portion of the pole 320 and a bottom portion of the pole 320 about a circumferential edge of each of the discs 310 ensures a rigid assembly of the gas adsorbent tree 300 without inhibiting free flow of gas onto and throughout the gas adsorbent tree 300. Optionally, a secondary spiral track (not shown) of an additional multiplicity of additional porous descending circuits defining therebetween an angle of declination may be positioned on the pole 320 above the primary spiral track and secured to the pole 320 intersecting the secondary spiral track longitudinally through a vertex of each of the additional porous descending circuits. The entirety of the gas adsorption tree 300 may then be enclosed within a silo having permeable walls such as netting so as to permit the free flow of gas onto the gas adsorbent tree 300.

Figure 4:
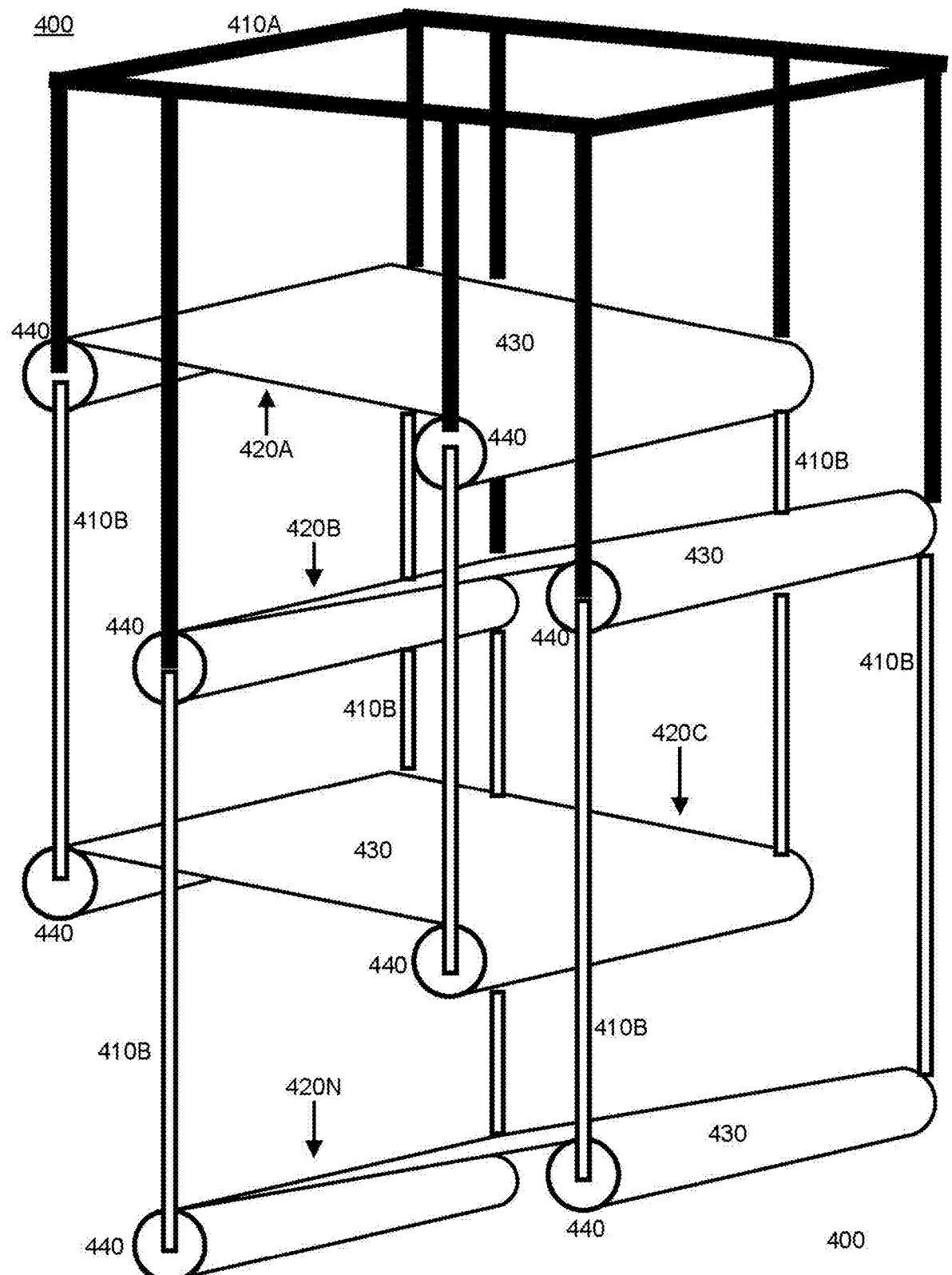

In an alternative form of the gas adsorbent trees 230 of FIGS. 2A and 2B, the gas adsorbent trees 230 can take the form of a sequence of vertically arranged porous ramps of alternating angles of declination. In this regard, FIG. 4 is a perspective view of an alternating ramp embodiment of the gas adsorption tree of FIG. 1. As shown in FIG. 4, different ramps 420A, 420B, 420C, 420N are vertically arranged with respect to one another at different angles of declination with a proximal end of a lower one of a pair of the ramps 420A, 420B, 420C, 420N extending beyond a distal end of an upper one of the pair of the ramps 420A, 420B, 420C, 420N. Each of the ramps 420A, 420B, 420C, 420N can be formed by wrapping rods 440 with netting 430 so as to permit the freeflow of gas through the netting 430 onto gas adsorbent spheres (not shown) placed thereon. As in the example of FIG. 3, the width of each of the ramps 420A, 420B, 420C, 420N can be sufficient to accommodate several spheres positioned side by side and preferably twenty spheres.

Each of the ramps 420A, 420B, 420C, 420N can be secured as a non-rigid tree 400 in the form of a hanging garden. That is to say, a rigid frame 410A secures end caps of each of the rods 440 for the upper most two ramps 420A, 420B. The remaining lower ones of the ramps 420C, 420N are secured to alternating ones of the ramps 420A, 420B by means of a flexible cable 410B. As before, the rigid frame 410A is then secured to a pole (not shown) and the entirety of the tree 400 is then enclosed within a silo having permeable walls such as netting so as to permit the free flow of gas onto the gas adsorbent tree 400.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A gas adsorption tree comprising:
   a fixed track of a multiplicity of porous descending circuits defining therebetween an angle of declination and combining to form a primary spiral track;
   a single exit disposed at a distal end of the track; and
   a multiplicity of gas adsorbent spheres traversing each of the levels of the primary track towards the single exit according only to gravitational motivation.
2. The gas adsorption tree of claim 1, wherein the angle of declination is constant as between each of the porous descending levels.
3. The gas adsorption tree of claim 1, wherein each of the porous descending levels comprises netting.
4. The gas adsorption tree of claim 3, wherein the netting comprises intersecting strands of wire forming a wire mesh.
5. The gas adsorption tree of claim 3, wherein the netting comprises intersecting strands of nylon string.
6. The gas adsorption tree of claim 1, wherein the primary spiral track is secured to a shaft intersecting the spiral track longitudinally through a vertex of each of the porous descending circuits.
7. The gas adsorption tree of claim 6, wherein the primary spiral track is secured to the shaft with a series of cables affixed to a portion of the shaft above the primary spiral track at one end, at a circumferential portion of the primary spiral track, and to a portion of the shaft below the primary spiral track.
8. The gas adsorption tree of claim 6, further comprising a secondary spiral track of an additional multiplicity of additional porous descending circuits defining therebetween an angle of declination and positioned above the primary spiral track and secured to the shaft intersecting the second- ary spiral track longitudinally through a vertex of each of the additional porous descending circuits.

9. The gas adsorption tree of claim 1, further comprising an air handler disposed at one end of the track directing a column of air through the porous descending levels and about each of the gas adsorbent spheres.

10. The gas adsorption tree of claim 1, further comprising an exit sentry at the single exit and comprising a barricade toggleably inhibiting and permitting an exiting of proximate ones of the gas adsorbent spheres from a lowest one of the porous descending levels.

11. The gas adsorption tree of claim 1, wherein a radius of each of the porous descending levels exceeds a radius of each of the gas adsorbent spheres by a multiple value.

12. The gas adsorbent tree of claim 11, wherein the multiple value is twenty.

13. The gas adsorbent tree of claim 1, wherein the track comprises at least twenty of the porous descending levels separated from one another by at least a clearance exceeding a diameter of the gas adsorbent spheres.

* * * * *